US011703483B2

United States Patent
Rosengren et al.

(10) Patent No.: US 11,703,483 B2
(45) Date of Patent: Jul. 18, 2023

(54) VALVE UNIT FOR A CHROMATOGRAPHY APPARATUS

(71) Applicant: GE Healthcare Bio-Sciences AB, Uppsala (SE)

(72) Inventors: Lars Olof Nils Rosengren, Uppsala (SE); Kerstin Elisabet Erickson, Uppsala (SE); Tim Francois, Uppsala (SE)

(73) Assignee: Cytiva Sweden AB, Uppsala (SE)

(*) Notice: Subject to any disclaimer, the term of this patent is extended or adjusted under 35 U.S.C. 154(b) by 295 days.

(21) Appl. No.: 16/648,296

(22) PCT Filed: Sep. 21, 2018

(86) PCT No.: PCT/EP2018/075694
§ 371 (c)(1),
(2) Date: Mar. 18, 2020

(87) PCT Pub. No.: WO2019/057937
PCT Pub. Date: Mar. 28, 2019

(65) Prior Publication Data
US 2020/0284767 A1    Sep. 10, 2020

(30) Foreign Application Priority Data
Sep. 22, 2017   (GB) ...................................... 1715399

(51) Int. Cl.
G01N 30/20 (2006.01)
G01N 30/46 (2006.01)
B01D 15/18 (2006.01)

(52) U.S. Cl.
CPC ........... G01N 30/20 (2013.01); G01N 30/468 (2013.01); B01D 15/1821 (2013.01); *G01N 2030/201* (2013.01); *G01N 2030/205* (2013.01)

(58) Field of Classification Search
CPC ......... B01D 15/1821; G01N 2030/201; G01N 2030/205; G01N 30/20; G01N 30/42;
(Continued)

(56) References Cited

U.S. PATENT DOCUMENTS 3,992,175 A    11/1976   Klementi et al.
5,571,410 A *  11/1996   Swedberg .......... G01N 30/6095
                                                      422/69
(Continued)

FOREIGN PATENT DOCUMENTS

DE    60004583 T2 *  6/2004
DE    60108519 T2 *  3/2006  .............. F16K 31/06
(Continued)

OTHER PUBLICATIONS

General Electric, ÄKTApilot™ Instrument Handbook 18-1162-95 Edition AH, Feb. 2014 (Year: 2014).*
(Continued)

Primary Examiner — David L Singer
(74) Attorney, Agent, or Firm — Eversheds Sutherland (US) LLP

(57) ABSTRACT

The present invention relates to a valve unit (100) for a chromatography apparatus, the valve unit comprising a fluid inlet (110) configured to receive an input fluid, a fluid outlet (120) configured to provide an output fluid, a first pair of fluid ports (131,132) configured to be coupled to a first column, a second pair (141,142) of fluid ports configured to be coupled to a second column, a coupling valve assembly (200) configured to direct fluid between a selection of the fluid inlet (110), the fluid outlet (120), the first pair of fluid ports (131,132) and the second pair of fluid ports (141,142) in response to one or more control signals, wherein the coupling valve assembly is configured to direct fluid using a selection of membrane valves coupled by fluid channels
(Continued)

281: Pressure sensor
282: Pressure sensor comprised in a body of the coupling valve assembly. The invention further relates to a chromatography apparatus comprising the valve unit and a membrane valve comprised in the valve unit.

20 Claims, 11 Drawing Sheets

(58) Field of Classification Search
CPC . G01N 30/468; B01L 2400/0638; E03D 3/06; F16K 17/085; F16K 27/0236; F16K 31/0672; F16K 41/10–125; F16K 99/0015
See application file for complete search history.

(56) References Cited

U.S. PATENT DOCUMENTS

| | | | | |
|---|---|---|---|---|
| 6,537,506 | B1* | 3/2003 | Schwalbe | B01F 33/3012 422/615 |
| 7,318,912 | B2* | 1/2008 | Pezzuto | B01L 3/502707 422/50 |
| 2003/0106799 | A1* | 6/2003 | Covington | B29C 66/929 204/600 |
| 2007/0131615 | A1* | 6/2007 | Moran | F16K 31/06 251/129.01 |
| 2008/0053543 | A1* | 3/2008 | Baier | G01N 30/20 137/625.25 |
| 2008/0053901 | A1* | 3/2008 | Mierendorf | F16K 11/022 210/659 |
| 2008/0053917 | A1* | 3/2008 | Larson | F16K 99/0015 210/741 |
| 2009/0146095 | A1* | 6/2009 | Baril | F16K 7/17 251/331 |
| 2009/0170118 | A1* | 7/2009 | Schmidt | G01N 33/5432 435/7.1 |
| 2009/0212248 | A1* | 8/2009 | Kozak | F16K 31/0672 251/227 |
| 2009/0218286 | A1* | 9/2009 | Bisschops | G01N 30/467 210/656 |
| 2010/0165784 | A1* | 7/2010 | Jovanovich | F16K 99/0015 137/861 |
| 2010/0176058 | A1* | 7/2010 | Bryntesson | B01D 15/1864 210/659 |
| 2010/0303687 | A1* | 12/2010 | Blaga | F16K 99/0015 156/247 |
| 2011/0005932 | A1* | 1/2011 | Jovanovich | G01N 27/44721 204/453 |
| 2011/0126911 | A1* | 6/2011 | Kobrin | B01F 33/30 216/39 |
| 2012/0119129 | A1* | 5/2012 | Sakai | F16K 31/1225 251/321 |
| 2014/0318706 | A1* | 10/2014 | Poissy | C03B 23/245 156/308.2 |
| 2016/0319955 | A1* | 11/2016 | Gebauer | C12M 41/40 |
| 2017/0361245 | A1* | 12/2017 | Gebauer | G01N 30/20 |

FOREIGN PATENT DOCUMENTS

| | | | |
|---|---|---|---|
| DE | 102016108103 A1 | * | 6/2016 |
| DE | 102017115018 A1 | * | 9/2017 |
| EP | 1775001 A1 | | 4/2007 |
| JP | 51107279 A | | 9/1976 |
| JP | 3123803 U | | 7/2006 |
| JP | 2009511900 A | | 3/2009 |
| JP | 2017508143 A | | 3/2017 |
| WO | 2007043874 A1 | | 4/2007 |
| WO | 2008048395 A1 | | 4/2008 |
| WO | WO-2015095658 A1 | * | 6/2015 ............. B01D 15/10 |
| WO | 2015121425 A1 | | 8/2015 |
| WO | WO-2016107809 A1 | * | 7/2016 ......... B01D 15/1842 |

OTHER PUBLICATIONS

General Electric, ÄKTAprocess™ Operating Instructions Original instructions 29-0252-49 AA, Jan. 2013 (Year: 2013).*
GE Healthcare; Aug. 5, 2017; Manual title; gelifesciences.com (online); Available from cdn.gelifesciences.com/dmm3bwsv3/ AssetStream.aspx?mediaformatid=10061&destinationid=100 I 6&assetid= 14493; Accessed Feb. 23, 2018 See whole manual.
PCT International Search Report and Written Opinion for PCT Application No. PCT/EP2018/075694 dated Apr. 15, 2019 (16 pages).
GB Search Report for GB Application No. 1715399.0 dated Feb. 26, 2018 (4 pages).
Chin et al., "Simulated Moving Bed Equipment Designs," Separation and Purification Reviews, 2004, 33(2):77-155.
Office Action in Japanese Patent Application No. 2020-516661, dated Sep. 12, 2022 with English Summary. (8 pages).

* cited by examiner

281: Pressure sensor
282: Pressure sensor

COLUMN 1 INTELLIGENT PACKING

COLUMN 2 INTELLIGENT PACKING

VALVE UNIT FOR A CHROMATOGRAPHY APPARATUS

CROSS REFERENCE TO RELATED APPLICATIONS

This application claims the priority benefit of PCT/EP2018/075694 filed on Sep. 21, 2018, which claims priority to Great Britain Patent Application No. 1715399.0 filed Sep. 22, 2017, the entire contents of which are hereby incorporated by reference herein.

TECHNICAL FIELD

The present invention relates to valve unit for a chromatography apparatus. The invention further relates to a chromatography apparatus comprising the valve unit.

BACKGROUND

Chromatography is a well-known procedure for analyzing and preparing chemical mixtures or chemical samples. The sample may typically be suspended in a fluid, referred to as a buffer composition or resin. The various sample components of the mixture travel at different speeds, causing them to separate. This separation may be used to separate the sample components in a fractionation step where the mobile phase may be directed to different containers, e.g. by an outlet valve of the chromatography apparatus.

In some applications, e.g. in the biopharmaceutical field, recent advancements in genetic engineering and cell culture technology have driven expression levels higher than ever, putting a considerable burden on chemical sample downstream purification, especially the fractionation step. While the introduction of new chromatography buffer compositions significantly improves the efficiency of a process based on a conventional fixed bed chromatography, additional gains can be achieved by operating in a continuous manner. The latter is especially appealing when continuous bioreactors, such as those operated in perfusion mode, are employed.

In continuous chromatography, several identical columns are connected in an arrangement that allows columns to be operated in series and/or in parallel, depending on the method requirements. Thus, all columns can be run in principle simultaneously, but slightly shifted in method steps. The procedure may be repeated, such that each column is loaded/packed, eluted, and regenerated several times in the process. Compared to 'conventional' chromatography, wherein a single chromatography cycle is based on several consecutive steps, such as loading, wash, elution and regeneration, in continuous chromatography based on multiple identical columns all these steps occur simultaneously but on different columns each. Continuous chromatography operation results in a better utilization of chromatography resin or buffer compositions, reduced processing time and reduced buffer requirements, all of which benefits process economy. Continuous chromatography is sometimes denoted simulated moving bed (SMB) chromatography.

In fact, simulated moving bed technology has been utilized for decades in various other fields. For example, U.S. Pat. No. 3,291,726 (Universal Oil Products) described as early as 1966 a continuous simulated counter-current sorption process for the petrochemical industry.

As previously mentioned each column may be loaded/packed, eluted, cleaned, and regenerated several times in the process. An essential factor for a reliable continuous chromatography process is the quality of the columns used, and more specifically the similarity or even identity between columns. If the columns are not identical, the theoretical calculations will not be correct, and it will become difficult to design an efficient and robust continuous chromatography process. However, the loading/packing of a column, e.g. with a fluid such as chromatography buffer composition, is very complex in order to obtain repeatable results. Even small differences in the number of plates or other packing properties can have a huge effect on the end result.

A problem with conventional solutions is that performing continuous chromatography is a cumbersome, complex and time consuming operation. Often the process must be interrupted to perform reconnection of fluid couplings/tubes, to perform packing of columns or to load a pre-packed column, to perform cleaning operations etc.

Thus, there is a need for an improved chromatography apparatus for performing continuous chromatography.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein According to a first aspect of the invention, the above mentioned and other objectives are achieved by a valve unit for a chromatography apparatus, the valve unit comprising a fluid inlet configured to receive an input fluid, a fluid outlet configured to provide an output fluid, a first pair of fluid ports configured to be coupled to a first column, a second pair of fluid ports configured to be coupled to a second column, an coupling valve assembly configured to direct fluid between a selection of the fluid inlet, the fluid outlet, the first pair of fluid ports and the second pair of fluid ports in response to one or more control signals, wherein the coupling valve assembly is configured to direct fluid using a selection of membrane valves coupled by fluid channels comprised in a body of the coupling valve assembly.

Advantages of the invention according to the first aspect include making continuous chromatography a less cumbersome, a less complex and a less time consuming operation According to a second aspect of the invention, the above mentioned and other objectives are achieved by a membrane valve comprised in the coupling valve assembly according to the first aspect. The membrane valve comprises a body, a membrane arranged in the body and configured to allow flow of fluid between a center port and a side port when positioned in an open position and to block the flow of fluid between the center port and the side port when positioned in a closed position, a piston arranged along a longitudinal axis and coupled to the membrane, a spring arranged along the longitudinal axis and coupled at one end to the piston and at an opposite end to a operable drive, wherein the drive is configured to move the opposite end of the spring along the longitudinal axis in response to a received control signal to obtain said open and closed membrane positions.

According to a third aspect of the invention, the above mentioned and other objectives are achieved by a chromatography apparatus comprising the valve unit according to the first aspect.

The advantages of the second and third aspect of the invention are at least the same as for the first aspect of the invention.

Further applications and advantages of embodiments of the invention will be apparent from the following detailed description.

Figure 1:
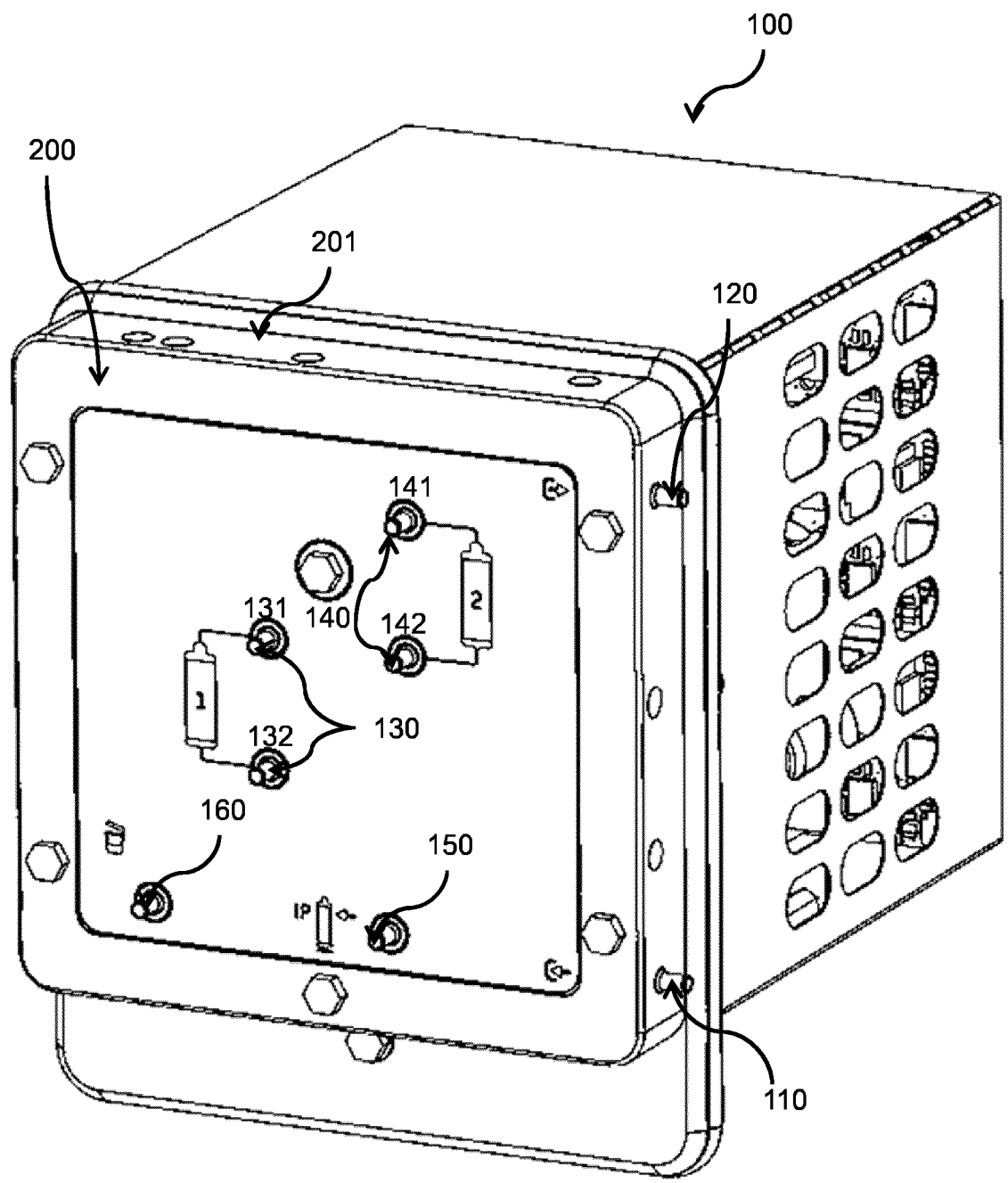
FIG. 1 shows a valve unit for a chromatography apparatus according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

An "or" in this description and the corresponding claims is to be understood as a mathematical OR which covers "and" and "or", and is not to be understood as an XOR (exclusive OR). The indefinite article "a" in this disclosure and claims is not limited to "one" and can also be understood as "one or more", i.e., plural.

In the present disclosure reference will be made interchangeably to container or reservoir, signifying a receptacle suitable for holding fluid. In the present disclosure reference will be made interchangeably to control system, processor and processing means.

In the present disclosure reference will be made interchangeably to a direct shape, a continuous shape or a coherent shape signifying a shape that substantially follows a continuous line, i.e. has no branches or forks between a start point of the line and an end point of the line.

FIG. 1 shows a valve unit 100 for a chromatography apparatus 400 according to one or more embodiments of the present disclosure. The chromatography apparatus 400 may be configured for performing continuous chromatography. The valve unit 100 comprises a fluid inlet 110 configured to receive an input fluid. The input fluid may e.g. be a chemical sample suspended in a buffer composition. The valve unit 100 further comprises a fluid outlet 120 configured to provide an output fluid from the valve unit 100. The provided output fluid may typically be the resulting fluid after passing the received input fluid through one or more columns of the chromatography apparatus 400. The valve unit 100 further comprises a first pair of fluid ports 130 configured to be coupled to a first column and/or a second pair of fluid ports 140 configured to be coupled to a second column. The valve unit 100 further comprises a coupling valve assembly 200 configured to direct fluid between a selection of the fluid inlet 110, the fluid outlet 120, the first pair of fluid ports 130 and the second pair of fluid ports 140 in response to one or more control signals.

The valve unit 100 further comprises circuitry or control circuitry, e.g. in the form of a processor and a memory. The memory contains instructions executable by the processor, whereby the valve unit 100 is operative and/or configured to direct fluid based on the one or more control signals. In one example, the circuitry receives a control signal and controls a set of membrane valves comprised in the coupling valve assembly 200 to an open or closed position.

The control signal may comprise a single or a plurality of control signals or control signal components indicative of a desired fluid coupling behavior of the coupling valve assembly 200, i.e. indicative of a desired manner to direct fluid to or from the fluid inlet 110, the fluid outlet 120, the first pair of fluid ports 130 and the second pair of fluid ports 140. The coupling valve assembly 200 is configured to direct fluid using a selection of membrane valves 231, 232, 241, 242, 250, 260, 271-276 coupled by fluid channels comprised in a body 201 of the coupling valve assembly 200. The control signal may comprise a wired or wireless signal capable of comprising information, e.g. a computer bus signal.

Figure 3:
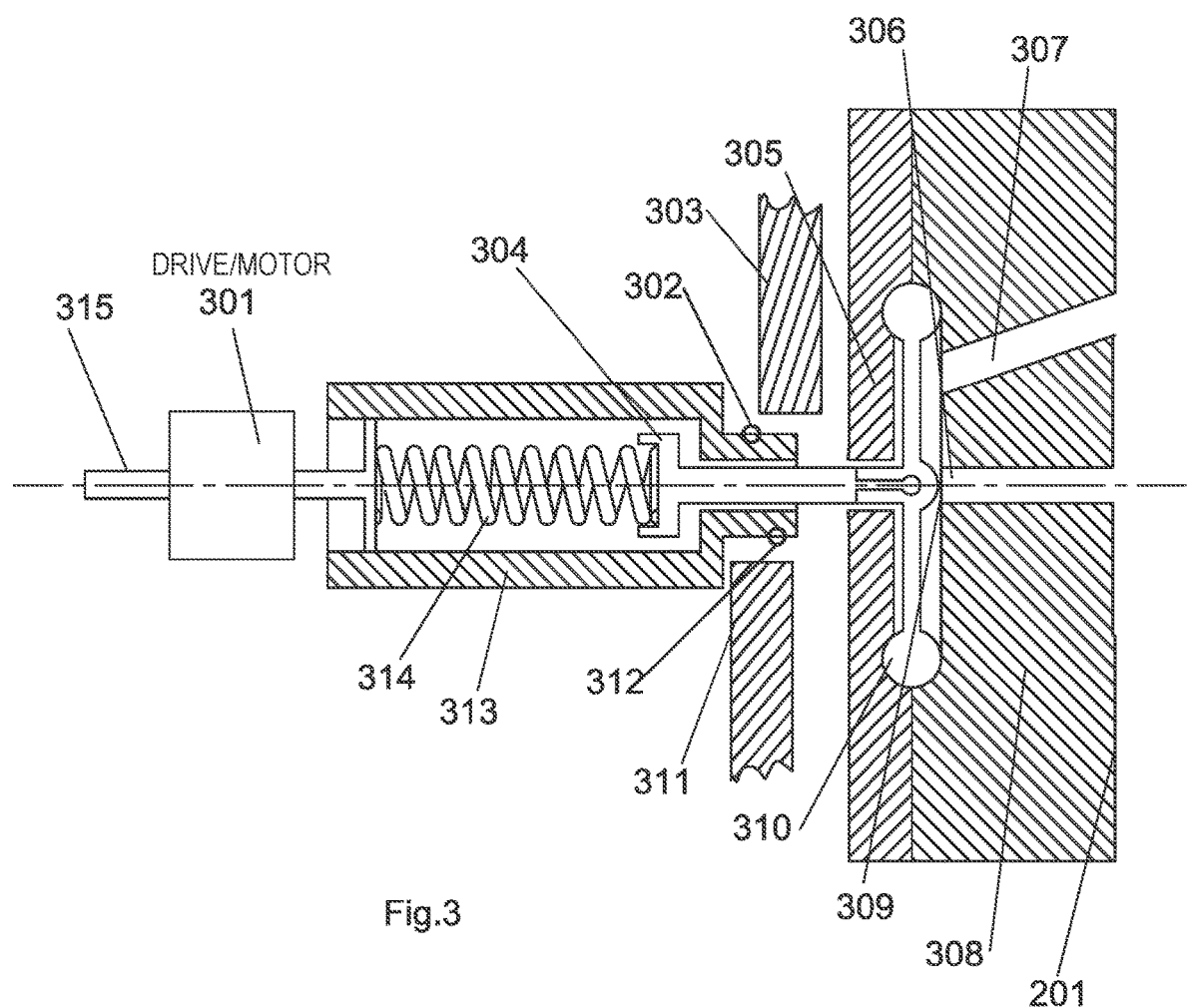
FIG. 3 shows a section view of one membrane valve comprised in the coupling valve assembly according to one or more embodiments of the present disclosure.

The membrane valves 231, 232, 241, 242, 250, 260, 271-276 are configured to allow flow of fluid when positioned in an open position and to block the flow of fluid when positioned in a closed position, as further described in relation to FIG. 3. Each fluid channel has a direct, a continuous or a coherent shape that connects two points in a direct, a continuous or a coherent manner to provide a fluid flow or a continuous fluid flow or a coherent fluid flow, thereby avoiding dead/stationary/stagnant legs, e.g. avoiding forks or branches in the fluid channel.

In one example, a first fluid channel connects fluid inlet 110 directly to a first membrane valve and a second subsequent fluid channel connects the first membrane valve directly to a second membrane valve in a direct, a continuous or a coherent manner, thereby avoiding dead/stationary/stagnant legs.

In one example, the one or more control signals are indicative of a desired position of the membrane valves 231, 232, 241, 242, 250, 260, 271-276, i.e. an open position or a closed position.

The valve unit 100 may further comprise any number of additional pairs of fluid ports for additional columns without deviating from the teaching of the present disclosure.

The first pair of fluid ports 130 may typically comprise a first fluid port 131 configured to be coupled to a top part of the first column and a second fluid port 132 configured to be coupled to a bottom part of the first column. The second pair of fluid ports 140 typically comprise a third fluid port 141 configured to be coupled to a top part of the second column and a fourth fluid port 142 configured to be coupled to a bottom part of the second column.

Figure 6A:
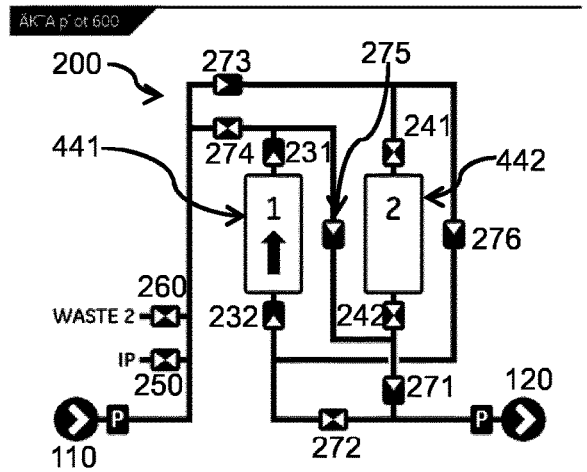
FIG. 6A-D schematically shows the coupling valve assembly operating in a single column flow mode according to one or more embodiments of the present invention.
Figure 6B:
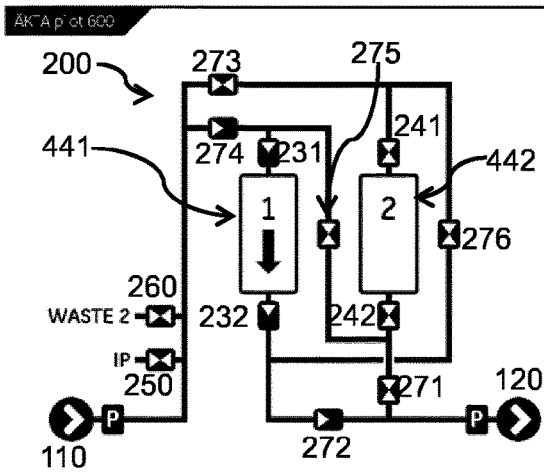
Figure 6C:
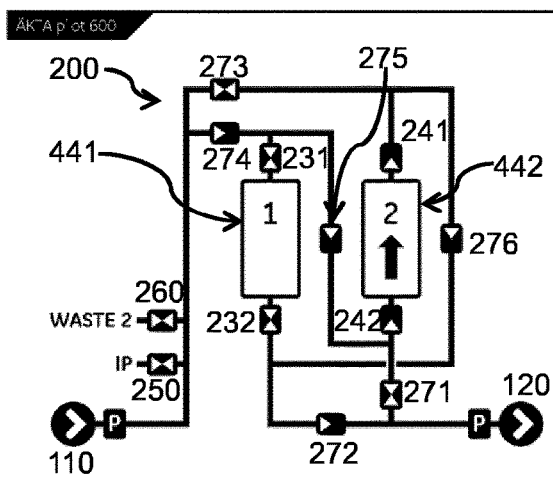
Figure 6D:
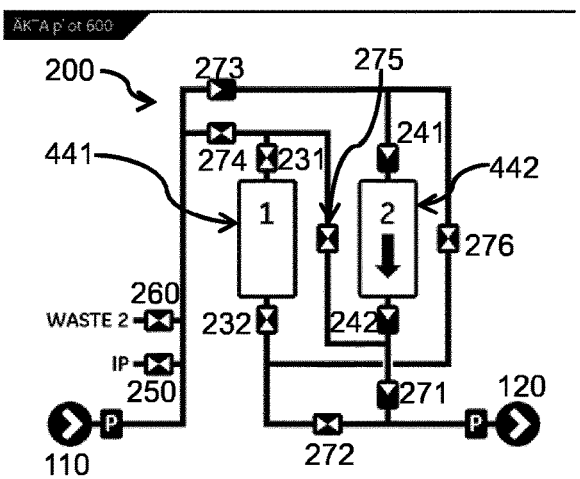

The valve unit 100 may in one or more embodiments operate in a single column downward flow mode, further described in relation to FIG. 6B and FIG. 6D.

In an embodiment, the coupling valve assembly 200 is configured to, in response to a first control signal 1_DOWN, couple the fluid inlet 110 to the first fluid port 131 and to couple the second fluid port 132 to the fluid outlet 120.

In an embodiment, the coupling valve assembly 200 is configured to, in response to a second control signal 2_DOWN, couple the fluid inlet 110 to the third fluid port 141 and to couple the fourth fluid port 142 to the fluid outlet 120.

The valve unit 100 may in one or more embodiments operate in a single column upward flow mode, further described in relation to FIG. 6A and FIG. 6C.

In an embodiment, the coupling valve assembly 200 is configured to, in response to a third control signal 1_UP, couple the fluid inlet 110 to the second fluid port 132 and to couple the first fluid port 131 to the fluid outlet 120 in response to receiving a third control signal 1_UP.

In an embodiment, the coupling valve assembly 200 is configured to, in response to a fourth control signal 2_UP, couple the fluid inlet 110 to the fourth fluid port 142 and to couple the third fluid port 141 to the fluid outlet 120.

Figure 7A:
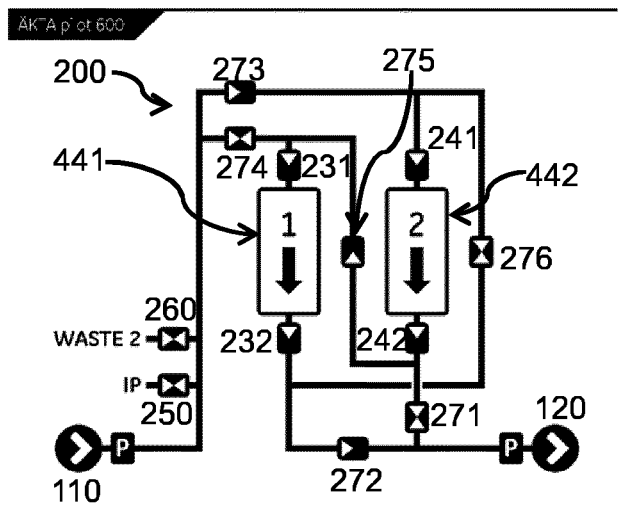
FIG. 7A-B schematically shows the coupling valve assembly operating in a dual-column continuous flow mode according to one or more embodiments of the present invention.
Figure 7B:
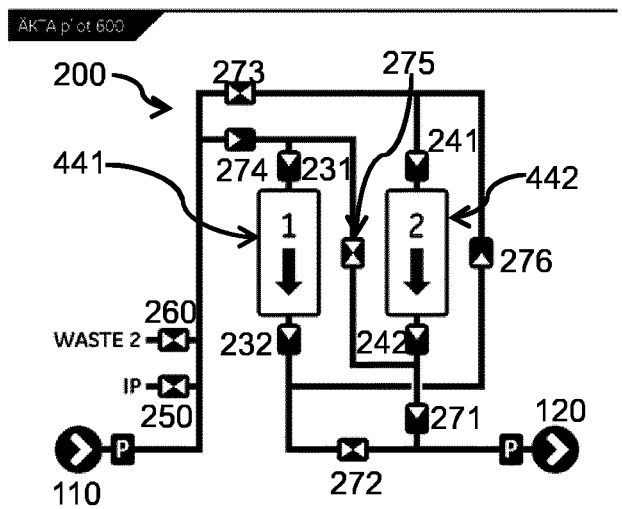

The valve unit 100 may in one or more embodiments operate in a dual-column continuous flow mode, further described in relation to FIG. 7A and FIG. 7B.

In an embodiment, the coupling valve assembly 200 is configured to, in response to a fifth control signal 1_DOWN-2_DOWN, couple the fluid inlet 110 to the first fluid port 131, couple the second fluid port 132 to the third fluid port 141, and couple the fourth fluid port 142 to the fluid outlet 120.

In an embodiment, the coupling valve assembly 200 is configured to, in response to a sixth control signal 2_DOWN-1_DOWN, couple the fluid inlet 110 to the third fluid port 141, couple the fourth fluid port 142 to the first fluid port 131 and to couple the second fluid port 132 to the fluid outlet 120.

Figure 8A:
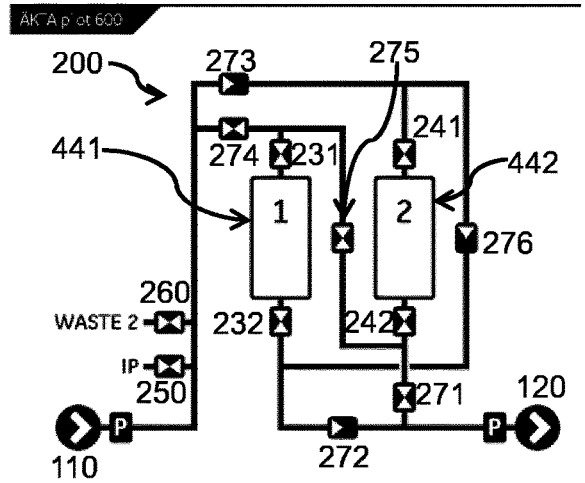
FIG. 8A-C schematically shows the coupling valve assembly 200 operating in a bypass mode according to one or more embodiments of the present invention.
Figure 8B:
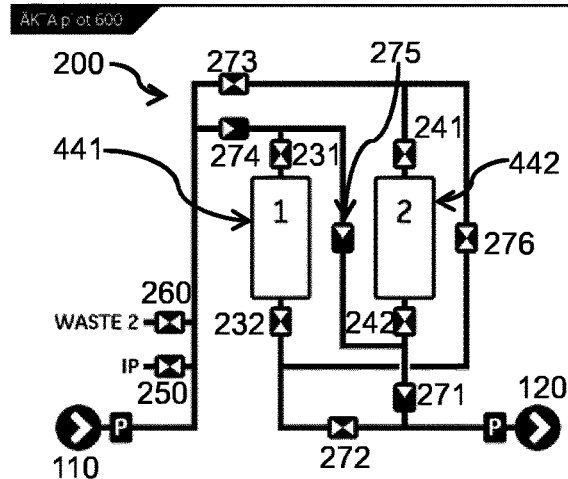
Figure 8C:
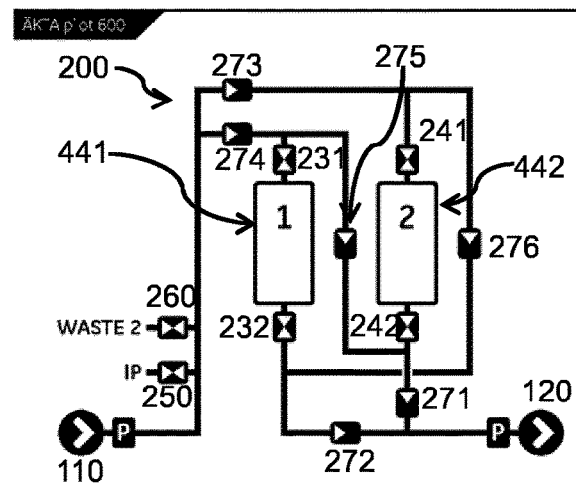

The valve unit 100 may in one or more embodiments operate in a bypass mode, further described in relation to FIG. 8A-C.

In an embodiment, the coupling valve assembly (200) is configured to couple the fluid inlet 110 to the fluid outlet 120 in response to receiving a seventh control signal BY_PASS_ALL, an eighth control signal BY_PASS_TOP or a ninth control signal BY_PASS_BOTTOM.

Figure 9:
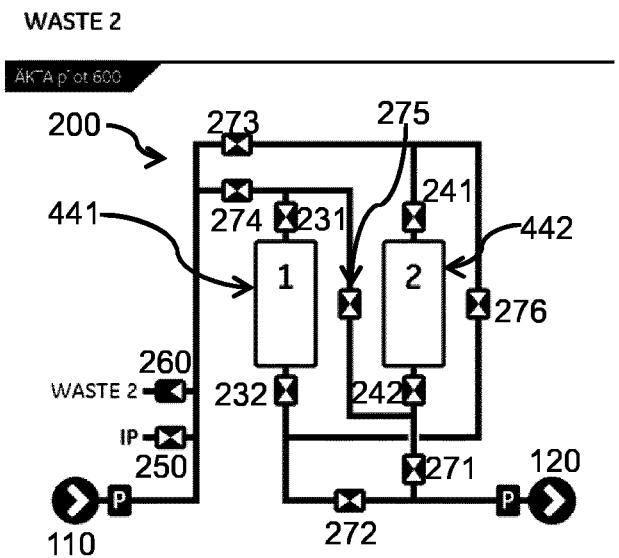
FIG. 9 schematically shows the coupling valve assembly 200 operating in a waste mode according to one or more embodiments of the present invention.

The valve unit 100 may in one or more embodiments operate in a waste mode, further described in relation to FIG. 9.

In an embodiment, the coupling valve assembly 200 further comprises a waste fluid port 160 and the coupling valve assembly 200 is configured to couple the fluid inlet 110 to the waste fluid port 160 in response to receiving a control signal 1_IP or 2_IP.

Figure 11A:
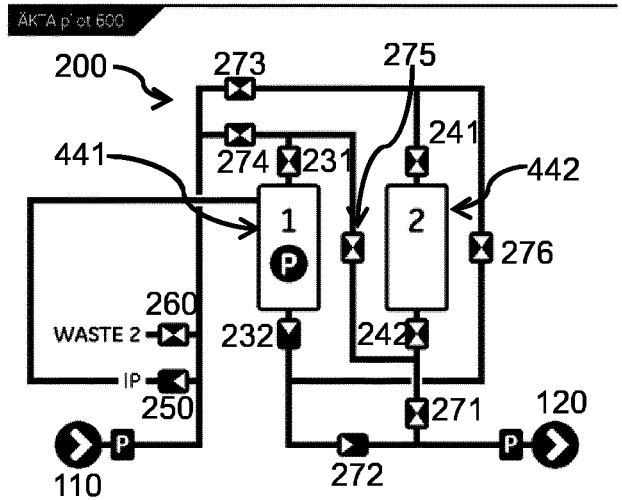
FIG. 11A-B schematically shows the coupling valve assembly 200 operating in an intelligent packing mode according to one or more embodiments of the present invention.
Figure 11B:
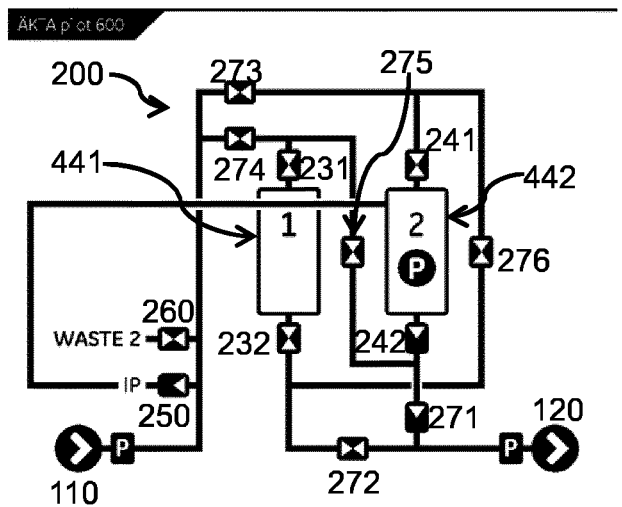

The valve unit 100 may in one or more embodiments operate in a packing or intelligent packing mode, further described in relation to FIG. 11A-B.

In an embodiment, the coupling valve assembly 200 further comprises a intelligent packing fluid port or packing fluid port 150 and the coupling valve assembly 200 is configured to couple the fluid inlet 110 to intelligent packing fluid port or packing fluid port 150 in response to receiving a control signal 1_IP or 2_IP.

The valve unit 100 may in one or more embodiments comprise fluid channels formed in a direct shape.

In an embodiment, the fluid channels comprised in the body 201 of the coupling valve assembly 200 are formed in a direct shape. The fluid channels are formed in a direct shape in the sense that each individual fluid channel is formed with one end terminating at a start point and an opposite end terminating at an end point. Each individual fluid channel may further be shaped with a substantially constant area of cross sections along the fluid channel. The start point and the end point comprises at least one of the fluid inlet 110, the fluid outlet 120, the first fluid port 131, the second fluid port 132, the third fluid port 141, the fourth fluid port 142, a center port 306 and an side port 307. The center port 306 and the side port 307 are typically comprised in of one of the membrane valves 231, 232, 241, 242, 250, 260, 271-276. Thereby dead/stationary/stagnant legs, where fluid remains stationary when fluid flows in the fluid channel, are avoided. Fluid channels are further described in relation to FIG. 2.

The valve unit 100 may in one or more embodiments be configured to provide one or more control or sensor signals indicative of fluid pressure at the fluid inlet 110 and/or the fluid outlet 120.

In an embodiment, the coupling valve assembly 200 further comprises a first pressure sensor 281 coupled to the fluid inlet 110 and configured for measuring a first pressure of the received fluid and a second pressure sensor 282 coupled to the fluid outlet 120 and configured for measuring a second pressure of the provided fluid.

Figure 2:
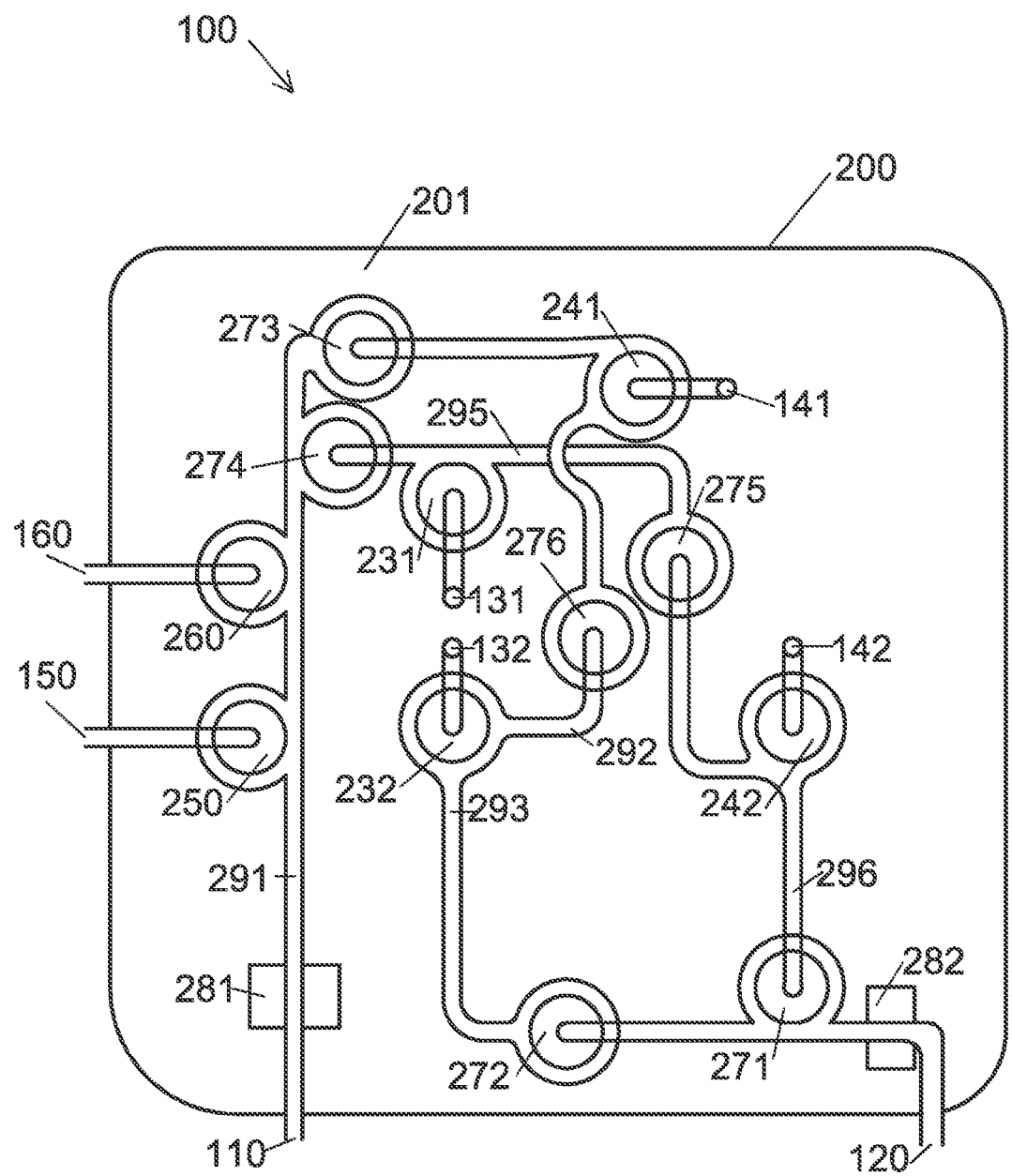
FIG. 2 shows a section view of the valve unit according to one or more embodiments of the present disclosure.

FIG. 2 shows a section view of the valve unit 100 according to one or more embodiments of the present disclosure. As further described in relation to FIG. 1, the valve unit 100 comprises the fluid inlet 110, the fluid outlet 120, the first fluid port 131 coupled to a side port of a first membrane valve 231, the second fluid port 132 coupled to a side port of a second membrane valve 232, the third fluid port 141 coupled to a side port of a third membrane valve 241 and the fourth fluid port 142 coupled to a side port of a fourth membrane valve 242. The valve unit 100 further comprises a fifth membrane valve 271, a sixth membrane valve 272, a seventh membrane valve 273, an eight membrane valve 274, a ninth membrane valve 275 and a tenth membrane valve 276.

The valve unit 100 may optionally further comprise an eleventh membrane valve 250 and a twelfth membrane valve 260.

A first fluid channel 291, formed in a direct shape, couples the fluid inlet 110 to the seventh membrane valve 273, e.g. to a center port of the seventh membrane valve 273. A second fluid channel 292, formed in a direct shape, couples the seventh membrane valve 273, e.g. the side port, to the tenth membrane valve 276, e.g. to the center port. A third fluid channel 293, formed in a direct shape, couples the tenth membrane valve 276, e.g. the side port, to the sixth membrane valve 272, e.g. to the center port. A fourth fluid channel 294, formed in a direct shape, couples the sixth membrane valve 272, e.g. the side port, to the fluid outlet 120. A fifth fluid channel 295, formed in a direct shape, couples the eight membrane valve 274, e.g. the side port, to the ninth membrane valve 275, e.g. to the center port. The center port of the eight membrane valve 274 is further coupled to the first fluid channel 291. A sixth fluid channel 296, formed in a direct shape, couples the ninth membrane valve 275, e.g. the side port, to the fifth membrane valve 271, e.g. to the center port.

The first fluid channel 291 may also be coupled to the eleventh membrane valve 250, e.g. to the center port. The first fluid channel 291 may also be coupled to the twelfth membrane valve 260, e.g. to the center port.

In an optional embodiment, the coupling valve assembly 200 further comprises a first pressure sensor 281 coupled to the fluid inlet 110 and configured for measuring a first pressure of the input fluid. The pressure sensor 281 may be coupled to the fluid inlet 110 by the first fluid channel 291, e.g. in-between the fluid inlet 110 and the eleventh membrane valve 250. In a further optional embodiment, the coupling valve assembly 200 further comprises a second pressure sensor 282 coupled to the fluid outlet 120 and configured for measuring a second pressure of the output fluid.

FIG. 3 shows a section view of one membrane valve 231, 232, 241, 242, 250, 260, 271-276 comprised in the coupling valve assembly 200 according to one or more embodiments of the present disclosure shown mid way between it's open and closed positions. In practice the valve will be closed as a default position, and opened when needed, according to the technique described below.

The membrane valve comprises the body 201 of the coupling valve assembly 200. The membrane valve further comprises a membrane 310 arranged in the body 201 and configured to allow flow of fluid between a center port 306 and a side port 307 when positioned in an open position and to block the flow of fluid between the center port 306 and the side port 307 when positioned in a closed position.

The membrane valve further comprises a piston 304 arranged along a longitudinal axis 315 and coupled to the membrane 310. The membrane valve further comprises a spring 314 arranged along the longitudinal axis 315 and at one end in contact with a piston 304, the spring being urgeable at an opposite end by a drive 301. The drive 301 is configured to move the opposite end of the spring 314 along the longitudinal axis 315 in response to a received control signal to obtain said open and closed membrane positions.

The membrane valve 231, 232, 241, 242, 250, 260, 271-276 may further comprise a valve front 308, and a valve rear 305, in this case, both being part of the valve body 201. The valve membrane 310 is held firmly between the front 308 and rear 305 of the valve body 201.

In one example of operating the membrane valve 231, 232, 241, 242, 250, 260, 271-276, a closing procedure from the "open" position is started. Circuitry, such as a microprocessor, comprised in the valve unit 100 gets a control signal from a control unit 410 in the chromatography apparatus indicative of a desire to close the valve. The circuitry causes the drive 301, e.g. a stepper motor, to move the spring housing 313 forward, pushing the spring 314 that pushes the piston 304, which presses the membrane 310 into the seat 309, thereby closing off the center port 306 from the side port 307. The center port 306 is normally the port for fluid in-flow, but it can also be the port for out-flow. When the membrane 310 reaches the seat 309, the piston 304 is prevented from moving further, but the drive 301 keeps pushing, thereby compressing the spring 314 which gives an increased force on the membrane 310 fro closing the valve. When the spring housing 313 has reached a certain position, a position flag close 302 is detected by a position sensor close 303. The stepper motor can then stop, or, if necessary, move a known amount of extra steps to increase the force applied to the membrane 310 even further.

In embodiments, some of the membrane valves 231, 232, 241, 242, 250, 260, 271-276 valves comprised in the coupling valve assembly 200 have high demands on short motion time and some have lower demands on speed but higher demands on closing force. The membrane valves with high demands on short motion time, may stop at the flag. Membrane valves with lower demands on speed but higher demands on closing force, may move an extra fixed distance. The behavior of valves with regards to the flag may be fully configurable from the control unit software, i.e. the hardware is exactly the same. E. g. in the coupling valve assembly 200 herein we can have both types of behavior of valves at different positions within the coupling valve assembly 200.

In one example of operating the membrane valve 231, 232, 241, 242, 250, 260, 271-276, an opening procedure from the "closed" position is started. The drive 301 moves on command or in response to control signals from the control unit 410 in the chromatography apparatus 400 indicative of a desire to open the valve. The drive 301 pulls on the spring housing 313. This releases the spring force until the back portion of the piston 304 is engaged with the spring housing, and the drive 301 starts pulling at the piston 304. The piston pulls the membrane which in turn is pulled out to the open position. When the position flag open 312 is detected by the piston sensor open 311, the drive 301 stops. The drive 301 does not move any extra steps when moving to the open position, but it is of course possible if needed.

Figure 4:
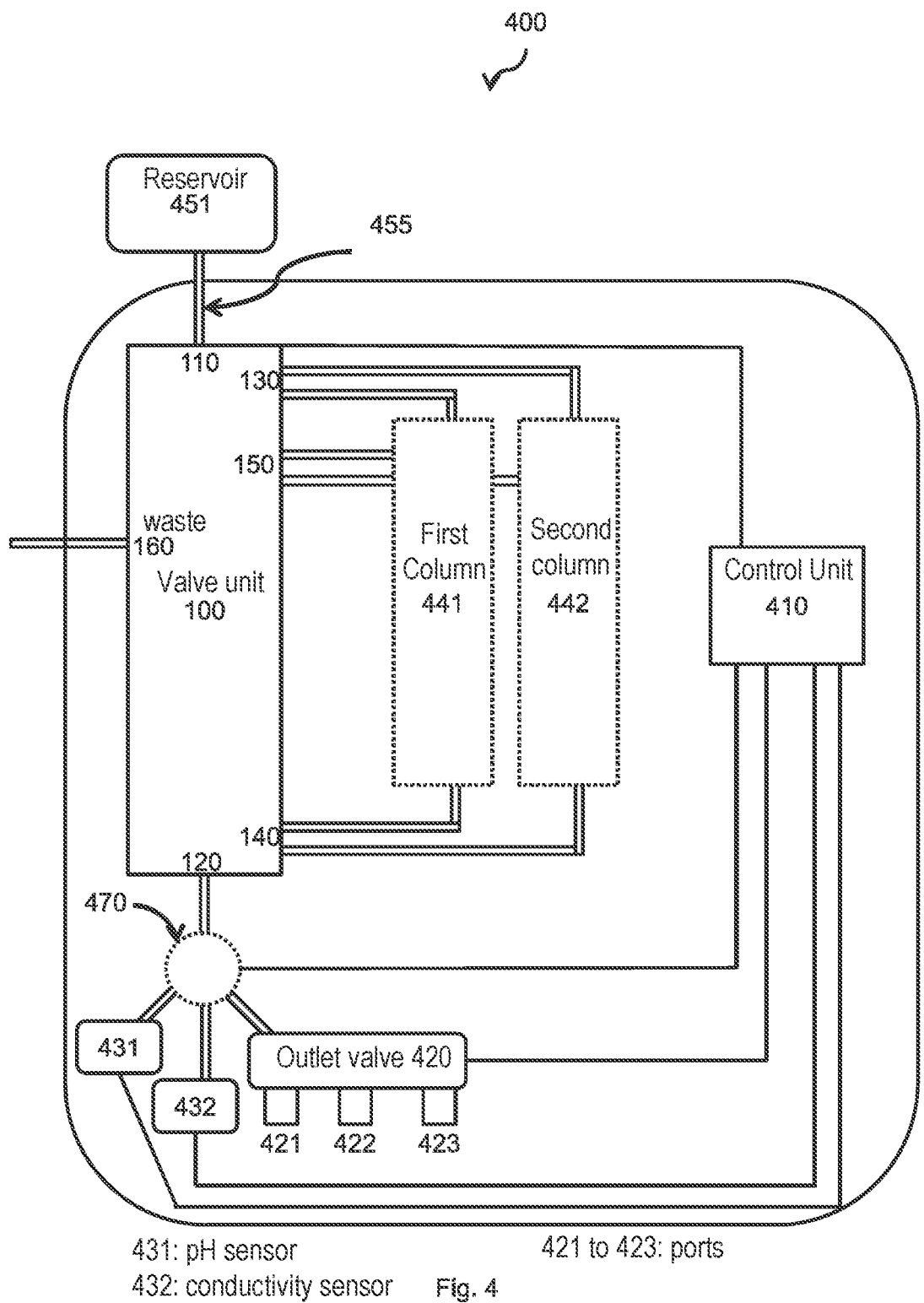
FIG. 4 shows a chromatography apparatus according to one or more embodiments of the disclosure.

FIG. 4 shows a chromatography apparatus 400 according to one or more embodiments of the disclosure. The chromatography apparatus 400 may typically comprise at least one inlet 455. The inlet may optionally be coupled to a reservoir 451 configured to hold a fluid. The inlet 455 may e.g. be implemented as tubular elements such as a tube or hose. The chromatography apparatus 400 may further comprise the valve unit 100, further described in relation to FIG. 1. The valve unit 100 may be coupled to the reservoir 451 by the inlet 455 coupled to the fluid inlet 110. The valve unit 100 may be configured to be coupled to the first column 441 by the first pair of fluid ports 130 and/or configured to be coupled to the second column 442 by the second pair of fluid ports 140. The first column 441 and/or the second column 442 may be comprised in the chromatography apparatus 400 or arranged external to the chromatography apparatus 400.

The chromatography apparatus 400 may further comprise an intelligent packing fluid port or packing fluid port 150 configured to be coupled to a packing port of the first column 441 or the second column 442. The chromatography apparatus 400 may further comprise a waste fluid port 160 configured to be coupled to a waste reservoir or drain.

The chromatography apparatus 400 may further comprise a control unit 410 which comprises circuitry, e.g. a processor and a memory. The memory may contain instructions executable by the processor, whereby said chromatography apparatus is operative to perform any of the steps or methods described herein. The control unit 410 is further described in relation to FIG. 5.

The chromatography apparatus 400 may optionally comprise a splitter 470 coupled to the fluid outlet 120 of the valve unit 100 and coupled to a selection of any of a pH sensor 431, a conductivity sensor 432 and an outlet valve 420. The splitter 470 may be configured to direct fluid received from the injection unit 480 to any of any of the pH sensor 431, the conductivity sensor 432 and the outlet valve 420. Optionally the splitter 470 may be communicatively coupled to the control unit and perform coupling of fluid in in response to a control signal from the control unit 410.

The pH sensor 431 may be communicatively coupled to the control unit 410 and configured for measuring the pH of the fluid provided by the splitter 470. The chromatography apparatus 400 may further comprise a conductivity sensor 432 communicatively coupled to the control unit 410 and configured for measuring the conductivity of the fluid provided by the splitter 470. The pH sensor 431 and/or the conductivity sensor 432 may further be configured to provide the measured pH and measured conductivity as control signals comprising measurement data to the control unit 410.

The chromatography apparatus 400 may further comprise an outlet valve 420 coupled to the splitter 470. The outlet valve 420 may have one or more outlets or outlet ports 421-423 and is configured to provide the fluid provided by the splitter 470 to the one or more outlets 421-423 in response to a control signal, e.g. received from the control unit 410.

Figure 5:
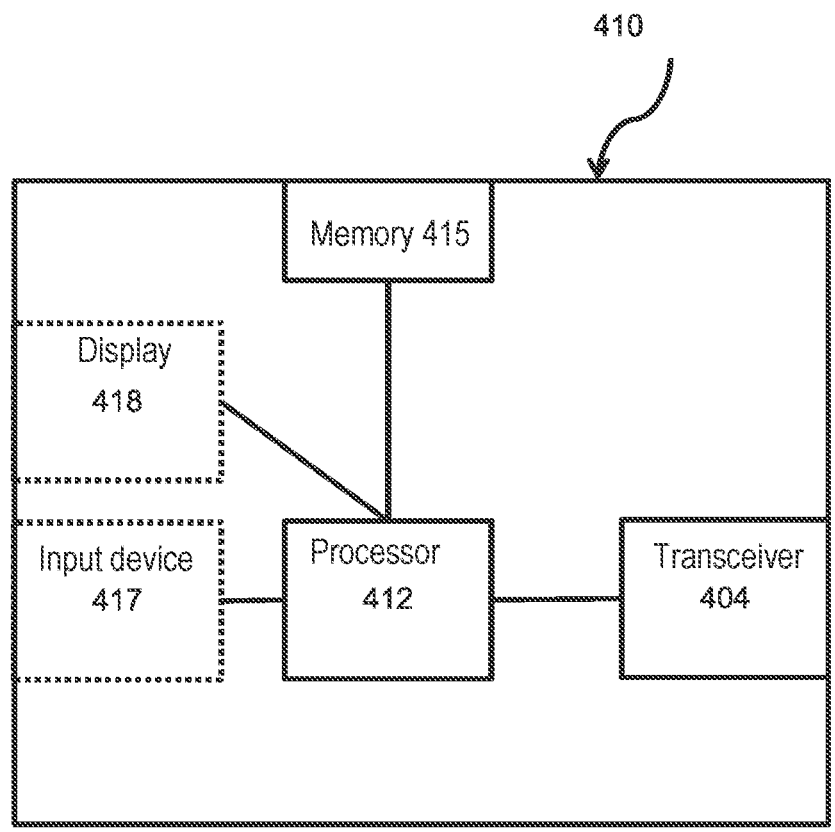
FIG. 5 shows a control unit according to one or more embodiments of the present invention.

FIG. 5 shows the control unit 410 according to one or more embodiments of the present invention. The control unit 410 may be in the form of e.g. an Electronic Control Unit, a server, an on-board computer, a stationary computing device, a laptop computer, a tablet computer, a handheld computer, a wrist-worn computer, a smart watch, a smartphone or a smart TV. The control unit 410 may comprise a processor 412 communicatively coupled to a transceiver 404 configured for wired or wireless communication. The control unit 410 may further comprise at least one optional antenna (not shown in figure). The antenna may be coupled to the transceiver 404 and is configured to transmit and/or emit and/or receive wired or wireless signals in a communication network, such as WiFi, Bluetooth, 3G, 4G, 5G etc. In one example, the processor 412 may be any of a selection of processing circuitry and/or a central processing unit and/or processor modules and/or multiple processors configured to cooperate with each-other. Further, the control unit 410 may further comprise a memory 415. The memory 415 may e.g. comprise a selection of a hard RAM, disk drive, a floppy disk drive, a flash drive or other removable or fixed media drive or any other suitable memory known in the art. The memory 415 may contain instructions executable by the processor to perform any of the steps or methods described herein. The processor 412 may be communicatively coupled to a selection of any of the transceiver 404, the memory 415 the pH sensor 431, the conductivity sensor 432, the outlet valve 420 and the splitter 470. The control unit 410 may be configured to send/receive control signals directly to any of the above mentioned units or to external nodes or to send/receive control signals via the wired and/or wireless communications network.

The wired/wireless transceiver 404 and/or a wired/wireless communications network adapter may be configured to send and/or receive data values or parameters as a signal to or from the processor 412 to or from other external nodes. E.g. measured pH or conductivity values.

In an embodiment, the transceiver 404 communicates directly to external nodes or via the wireless communications network.

In one or more embodiments the control unit 410 may further comprise an input device 417, configured to receive input or indications from a user and send a user input signal indicative of the user input or indications to the processing means 412.

In one or more embodiments the control unit 410 may further comprise a display 418 configured to receive a display signal indicative of rendered objects, such as text or graphical user input objects, from the processing means 412 and to display the received signal as objects, such as text or graphical user input objects.

In one embodiment the display 418 is integrated with the user input device 417 and is configured to receive a display signal indicative of rendered objects, such as text or graphical user input objects, from the processing means 412 and to display the received signal as objects, such as text or graphical user input objects, and/or configured to receive input or indications from a user and send a user-input signal indicative of the user input or indications to the processing means 412.

In a further embodiment, the control unit 410 may further comprise and/or be coupled to one or more additional sensors (not shown in the figure) configured to receive and/or obtain and/or measure physical properties pertaining to the chromatography apparatus 400 and send one or more sensor signals indicative of the physical properties to the processing means 412.

In one or more embodiments, the processing means 412 is further communicatively coupled to the input device 417 and/or the display 418 and/or the additional sensors.

FIG. 6A schematically shows the coupling valve assembly 200 operating in a single column upward flow mode for the first column 441 according to one or more embodiments of the present invention. FIG. 6A further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 1_UP, is then received, e.g. by circuitry comprised in the coupling valve assembly 200, and a set of the membrane valves are then controlled to the open position. The seventh membrane valve 273, the tenth membrane valve 276, the second membrane valve 232, the first membrane valve 231, the ninth membrane valve 275 and the fifth membrane valve 271 are then controlled to the open position. The first column 441 may then be packed or filled with fluid, e.g. to prepare for an upcoming chromatography run.

FIG. 6B schematically shows the coupling valve assembly 200 operating in a single column downward flow mode for the first column 441 according to one or more embodiments of the present invention. FIG. 6B further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 1_DOWN, is then received, e.g. by circuitry comprised in the coupling valve assembly 200, and a set of the membrane valves are then controlled to the open position. The eight membrane valve 274, the first membrane valve 231, the second membrane valve 232 and the sixth membrane valve 272 are then controlled to the open position. The first column 441 may then be packed or filled with fluid, e.g. to prepare for an upcoming chromatography run.

FIG. 6C schematically shows the coupling valve assembly 200 operating in a single column upward flow mode for the second column 442 according to one or more embodiments of the present invention. FIG. 6C further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 2_UP, is then received, e.g. by circuitry comprised in the coupling valve assembly 200, and a set of the membrane valves are then controlled to the open position. The eight membrane valve 274, ninth membrane valve 275, the fourth membrane valve 242, the third membrane valve 241 and the tenth membrane valve 276 are then controlled to the open position. The second column 442 may then be packed or filled with fluid, e.g. to prepare for an upcoming chromatography run.

FIG. 6D schematically shows the coupling valve assembly 200 operating in a single column downward flow mode for the second column 442 according to one or more embodiments of the present invention. FIG. 6D further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 2_DOWN, is then received, e.g. by circuitry comprised in the coupling valve assembly 200, and a set of the membrane valves are then controlled to the open position. The seventh membrane valve 273, the third membrane valve 241, the fourth membrane valve 242 and the fifth membrane valve 271 are then controlled to the open position. The first column 441 may then be packed or filled with fluid, e.g. to prepare for an upcoming chromatography run.

FIG. 7A schematically shows the coupling valve assembly 200 operating in a dual-column continuous flow mode from the second column 442 to the first column 441 according to one or more embodiments of the present invention. FIG. 7A further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 2_DOWN-1_DOWN, is then received, e.g. by circuitry comprised in the coupling valve assembly 200, and a set of the membrane valves are then controlled to the open position. The seventh membrane valve 273, the third membrane valve 241, the fourth membrane valve 242, the ninth membrane valve 275, the first membrane valve 231, the second membrane valve 232 and the sixth membrane valve 272 are then controlled to the open position. The second column 442 and/or the first column 441 may then be packed or filled with fluid, e.g. to prepare for an upcoming chromatography run.

FIG. 7B schematically shows the coupling valve assembly 200 operating in a dual-column continuous flow mode from the first column 441 to the second column 442 according to one or more embodiments of the present invention. FIG. 7B further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 1_DOWN-2_DOWN, is then received, e.g. by circuitry comprised in the coupling valve assembly 200, and a set of the membrane valves are then controlled to the open position. The eight membrane valve 274, the first membrane valve 231, the second membrane valve 232, the tenth membrane valve 276, the third membrane valve 241, the fourth membrane valve 242 and the fifth membrane valve 271 are then controlled to the open position. The first column 441 and/or the second column 442 may then be packed or filled with fluid, e.g. to prepare for an upcoming chromatography run.

FIG. 8A schematically shows the coupling valve assembly 200 operating in a top bypass mode according to one or more embodiments of the present invention. FIG. 8A further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, BY_PASS_TOP, is then received, e.g. by circuitry comprised in the coupling valve assembly 200, and a set of the membrane valves are then controlled to the open position. The seventh membrane valve 273, the tenth membrane valve 276 and the sixth membrane valve 272 are then controlled to the open position. The fluid channels providing the top part of the columns with fluid are then filled, rinsed or cleaned, e.g. to prepare the fluid channels for an upcoming chromatography run.

FIG. 8B schematically shows the coupling valve assembly 200 operating in a bottom bypass mode according to one or more embodiments of the present invention. FIG. 8B further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, BY_PASS_BOTTOM, is then received, e.g. by circuitry comprised in the coupling valve assembly 200, and a set of the membrane valves are then controlled to the open position. The eight membrane valve 274, the ninth membrane valve 275 and the fifth membrane valve 271 are then controlled to the open position. The fluid channels providing the bottom part of the columns with fluid are then filled, rinsed or cleaned, e.g. to prepare the fluid channels for an upcoming chromatography run.

FIG. 8C schematically shows the coupling valve assembly 200 operating in an all bypass mode according to one or more embodiments of the present invention. FIG. 8C further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, BY_PASS_ALL, is then received, e.g. by circuitry comprised in the coupling valve assembly 200, and a set of the membrane valves are then controlled to the open position. The seventh membrane valve 273, the tenth membrane valve 276 and the sixth membrane valve 272, the eight membrane valve 274, the ninth membrane valve 275 and the fifth membrane valve 271 are then controlled to the open position. The fluid channels providing the top and bottom parts of the columns with fluid are then filled, rinsed or cleaned, e.g. to prepare the fluid channels for an upcoming chromatography run.

FIG. 9 schematically shows the coupling valve assembly 200 operating in a waste mode according to one or more embodiments of the present invention. FIG. 9 further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, WASTE, is then received, e.g. by circuitry comprised in the coupling valve assembly 200, and a set of the membrane valves are then controlled to the open position. The twelfth membrane valve 260 is then controlled to the open position. The fluid is then typically provided to a waste container.

Figure 10A:
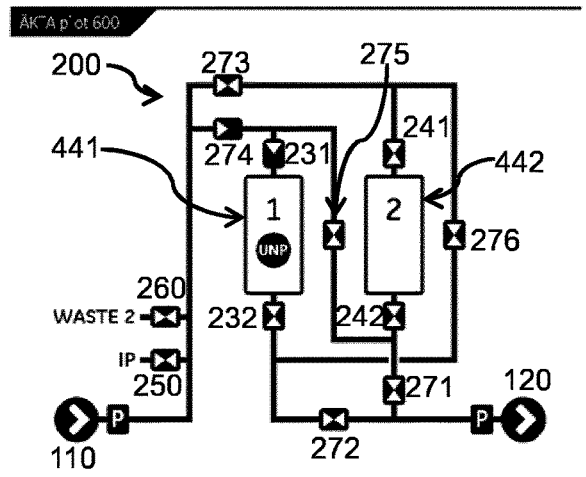
FIG. 10A-D schematically shows the coupling valve assembly 200 operating in an unpacking mode according to one or more embodiments of the present invention.

FIG. 10A schematically shows the coupling valve assembly 200 first column downward unpacking mode according to one or more embodiments of the present invention. FIG. 10A further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 1_UNPACK_DOWN, is then received, e.g. by circuitry comprised in the coupling valve assembly 200, and a set of the membrane valves are then controlled to the open position. The eight membrane valve 274 and the first membrane valve 231 are then controlled to the open position.

Figure 10B:
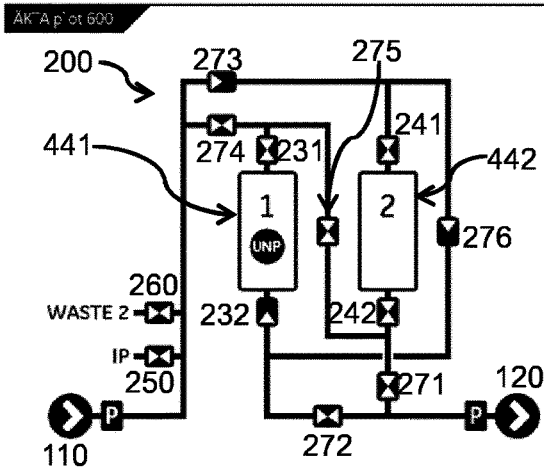

FIG. 10B schematically shows the coupling valve assembly 200 first column upward unpacking mode according to one or more embodiments of the present invention. FIG. 10B further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 1_UNPACK_UP, is then received, e.g. by circuitry comprised in the coupling valve assembly 200, and a set of the membrane valves are then controlled to the open position. The seventh membrane valve 273, the tenth membrane valve 276 and the second membrane valve 232 are then controlled to the open position.

Figure 10C:
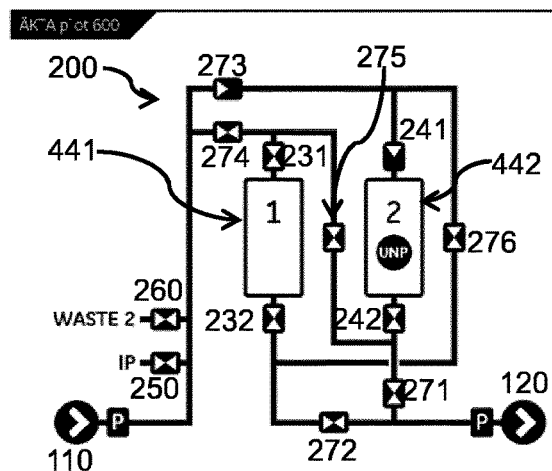

FIG. 10C schematically shows the coupling valve assembly 200 second column downward unpacking mode according to one or more embodiments of the present invention. FIG. 10C further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 2_UNPACK_DOWN, is then received, e.g. by circuitry comprised in the coupling valve assembly 200, and a set of the membrane valves are then controlled to the open position. The eight membrane valve 274, the ninth membrane valve 275 and the fourth membrane valve 242 are then controlled to the open position.

Figure 10D:
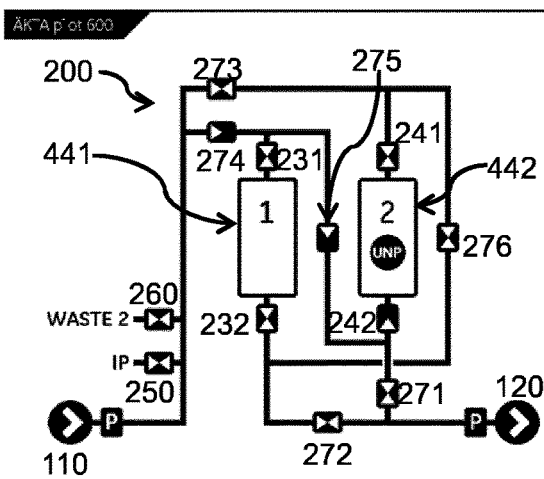

FIG. 10D schematically shows the coupling valve assembly 200 second column upward unpacking mode according to one or more embodiments of the present invention. FIG. 10D further shows the various membrane valves and fluid channels comprised by the coupling valve assembly 200, further described in relation to FIG. 2.

In one example, all membrane valves 231, 232, 241, 242, 250, 260, 271-276 are initially in the closed position. A control signal, 2_UNPACK_UP, is then received, e.g. by circuitry comprised in the coupling valve assembly 200, and a set of the membrane valves are then controlled to the open position. The eight membrane valve 274, the ninth membrane valve 275 and the fourth membrane valve 242 are then controlled to the open position.

FIG. 11A schematically shows the coupling valve assembly 200 operating in an intelligent packing flow mode or packing flow mode for the first column 441 according to one or more embodiments of the present invention. FIG. 11A further shows the various membrane valves and fluid channels comprised by the coupling valve assembly 200, further described in relation to FIG. 2.

In one example, all membrane valves 231, 232, 241, 242, 250, 260, 271-276 are initially in the closed position. The eleventh membrane valve 250 is coupled to the first column. A control signal, 1_IP, is then received, e.g. by circuitry comprised in the coupling valve assembly 200, and a set of the membrane valves are then controlled to the open position. The eleventh membrane valve 250, the second membrane valve 232 and the sixth membrane valve 272 are then controlled to the open position. The first column 441 may then be packed or filled with fluid, e.g. to prepare for an upcoming chromatography run.

FIG. 11B schematically shows the coupling valve assembly 200 operating in an intelligent packing flow mode or packing flow mode for the second column 442 according to one or more embodiments of the present invention. FIG. 11B further shows the various membrane valves and fluid channels comprised by the coupling valve assembly 200, further described in relation to FIG. 2.

In one example, all membrane valves 231, 232, 241, 242, 250, 260, 271-276 are initially in the closed position. The eleventh membrane valve 250 is coupled to the second column. A control signal, 2_IP, is then received, e.g. by circuitry comprised in the coupling valve assembly 200, and a set of the membrane valves are then controlled to the open position. The eleventh membrane valve 250, the fourth membrane valve 242 and the fifth membrane valve 271 are then controlled to the open position. The first column 441 may then be packed or filled with fluid, e.g. to prepare for an upcoming chromatography run.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (WiMAX) and ultrasonic communication, etc., but is not limited thereto.

Moreover, it is realized by the skilled person that the control unit 410 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processor" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A valve unit for a chromatography apparatus, the valve unit comprising:
   a fluid inlet configured to receive an input fluid,
   a fluid outlet configured to provide an output fluid,
   a first pair of fluid ports comprising a first fluid port and a second fluid port configured to be coupled to a first column,
   a second pair of fluid ports comprising a third fluid port and a fourth fluid port configured to be coupled to a second column, and
   a coupling valve assembly configured to direct fluid between a selection of the fluid inlet, the fluid outlet, the first pair of fluid ports and the second pair of fluid ports in response to one or more control signals,
   wherein the coupling valve assembly is configured to direct fluid using a selection of membrane valves coupled by fluid channels defined within a body of the coupling valve assembly,
   wherein the selection of membrane valves comprises a first membrane valve, a second membrane valve, a third membrane valve, a fourth membrane valve, a fifth membrane valve, a sixth membrane valve, a seventh membrane valve, an eighth membrane valve, a ninth membrane valve, and a tenth membrane valve,
   wherein the fluid channels comprise a direct shape following a line having no branches or forks between a start point of the line and an end point of the line, the direct shape being configured to avoid dead, stationary, or stagnant legs,
   wherein the first fluid port is coupled to a side port of the first membrane valve, the second fluid port is coupled to a side port of the second membrane valve, the third fluid port is coupled to a side port of the third membrane valve, and the fourth fluid port is coupled to a side port of the fourth membrane valve,
   wherein a first fluid channel of said fluid channels connects the fluid inlet to an eleventh membrane valve of a packing fluid port, the seventh membrane valve, the eighth membrane valve and a twelfth membrane valve of a waste fluid port,
   wherein a second fluid channel of said fluid channels couples the seventh membrane valve to the tenth membrane valve,
   wherein a third fluid channel of said fluid channels couples the tenth membrane valve to the sixth membrane valve,
   wherein a fourth fluid channel of said fluid channels couples the sixth membrane valve to the fluid outlet,
   wherein a fifth fluid channel of said fluid channels couples the eighth membrane valve to the ninth membrane valve, and
   wherein a sixth fluid channel of said fluid channels couples the ninth membrane valve to the fifth membrane valve.

2. The valve unit according to claim 1,
   wherein the first fluid port is configured to be coupled to a top part of the first column and the second fluid port is configured to be coupled to a bottom part of the first column,
   wherein the third fluid port is configured to be coupled to a top part of the second column and the fourth fluid port is configured to be coupled to a bottom part of the second column.

3. The valve unit according to claim 2, wherein the coupling valve assembly is configured, in response to a first control signal (1_DOWN), to couple the fluid inlet to the first fluid port and to couple the second fluid port to the fluid outlet.

4. The valve unit according to claim 2, wherein the coupling valve assembly is configured to, in response to a second control signal (2_DOWN), couple the fluid inlet to the third fluid port and to couple the fourth fluid port to the fluid outlet.

5. The valve unit according to claim 2, wherein the coupling valve assembly is configured to, in response to a third control signal (1_UP), couple the fluid inlet to the second fluid port and to couple the first fluid port to the fluid outlet.

6. The valve unit according to claim 2, wherein the coupling valve assembly is configured to, in response to a fourth control signal (2_UP), couple the fluid inlet to the fourth fluid port and to couple the third fluid port to the fluid outlet.

7. The valve unit according to claim 2, wherein the coupling valve assembly is configured to, in response to a fifth control signal (1_DOWN-2_DOWN),
   couple the fluid inlet to the first fluid port,
   couple the second fluid port to the third fluid port, and
   couple the fourth fluid port to the fluid outlet.

8. The valve unit according to claim 2, wherein the coupling valve assembly is configured to, in response to a sixth control signal (2_DOWN-1_DOWN),
   couple the fluid inlet to the third fluid port,
   couple the fourth fluid port to the first fluid port, and
   couple the second fluid port to the fluid outlet.

9. The valve unit according to claim 1, wherein the coupling valve assembly is configured to, in response to a seventh control signal (BY_PASS_ALL), an eighth control signal (BY_PASS_TOP) or a ninth control signal (BY_PASS_BOTTOM), couple the fluid inlet to the fluid outlet.

10. The valve unit according to claim 1, wherein the coupling valve assembly further comprises the waste fluid port and the coupling valve assembly is configured to, in response to a tenth control signal (WASTE), couple the fluid inlet to the waste fluid port.

11. The valve unit according to claim 1, wherein the coupling valve assembly further comprises a first pressure sensor coupled to the fluid inlet and configured to measure a first pressure of the received fluid and a second pressure sensor coupled to the fluid outlet and configured to measure a second pressure of the provided fluid.

12. A chromatography apparatus, the chromatography apparatus comprising:
   the valve unit according to claim 1, the valve unit comprising the fluid inlet coupled to a reservoir, the first pair of fluid ports comprising the first fluid port configured to be coupled to a top part of a first column, the first pair of fluid ports comprising the second fluid port configured to be coupled to a bottom part of the first column, the second pair of fluid ports comprising the third fluid port configured to be coupled to a top part of the second column and the fourth fluid port configured to be coupled to a bottom part of the second column, and a control unit comprising circuitry comprising:

a processor, and a memory, said memory containing instructions executable by said processor, whereby said chromatography apparatus is operative to control the valve unit to direct fluid between a selection of the fluid inlet, the fluid outlet, the first fluid port, the second fluid port, the third fluid port and the fourth fluid port by sending one or more control signals to the valve unit.

13. The chromatography apparatus according to claim 12, operative to control the valve unit by sending a first control signal (1_DOWN) to control the valve unit to couple the fluid inlet to the first fluid port and to couple the second fluid port to the fluid outlet.

14. The chromatography apparatus according to claim 12, operative to control the valve unit by sending a second control signal (2_DOWN) to control the valve unit to couple the fluid inlet to the third fluid port and to couple the fourth fluid port to the fluid outlet.

15. The chromatography apparatus according to claim 12, operative to control the valve unit by sending a third control signal (1_UP) to control the valve unit to couple the fluid inlet to the second fluid port and to couple the first fluid port to the fluid outlet in response to a third control signal (1_UP).

16. The chromatography apparatus according to claim 12, operative to control the valve unit by sending a fourth control signal (2_UP) to control the valve unit to couple the fluid inlet to the fourth fluid port and to couple the third fluid port to the fluid outlet.

17. The chromatography apparatus according to claim 12, operative to control the valve unit by sending a fifth control signal (1_DOWN-2_DOWN) to control the valve unit to:
couple the fluid inlet to the first fluid port,
to couple the second fluid port to the third fluid port, and
to couple the fourth fluid port to the fluid outlet.

18. The chromatography apparatus according to claim 12, operative to control the valve unit by sending a sixth control signal (2_DOWN-1_DOWN) to control the valve unit to:
couple the fluid inlet to the third fluid port,
to couple the fourth fluid port to the first fluid port, and
to couple the second fluid port to the fluid outlet.

19. The chromatography apparatus according to claim 12, operative to control the valve unit by sending a seventh control signal (BY_PASS_ALL), an eighth control signal (BY_PASS_TOP) or a ninth control signal (BY_PASS_BOTTOM) to control the valve unit to couple the fluid inlet to the fluid outlet.

20. The chromatography apparatus according to claim 12, wherein the valve unit further comprises the waste fluid port and the chromatography apparatus is operative to control the valve unit by sending a tenth control signal (WASTE) to control the valve unit to couple the fluid inlet to the waste fluid port.

* * * * *